US011045988B1

(12) United States Patent
Molinari (10) Patent No.: US 11,045,988 B1
(45) Date of Patent: Jun. 29, 2021

(54) APPARATUS FOR DETACHING COMPLETED PRINTS FROM A 3D PRINTER

(71) Applicant: Mike Molinari, New London, CT (US)

(72) Inventor: Mike Molinari, New London, CT (US)

( * ) Notice: Subject to any disclaimer, the term of this patent is extended or adjusted under 35 U.S.C. 154(b) by 219 days.

(21) Appl. No.: 16/378,974

(22) Filed: Apr. 9, 2019

Related U.S. Application Data

(60) Provisional application No. 62/668,254, filed on May 7, 2018.

(51) Int. Cl.
*B33Y 30/00* (2015.01)
*B29C 45/40* (2006.01)
*B29C 33/44* (2006.01)
*B33Y 40/00* (2020.01)

(52) U.S. Cl.
CPC ........ *B29C 45/4005* (2013.01); *B29C 33/444* (2013.01); *B33Y 30/00* (2014.12); *B33Y 40/00* (2014.12)

(58) Field of Classification Search
IPC ................ B29C 44/4005,33/444; B33Y 30/00, 40/00
See application file for complete search history.

(56) References Cited

U.S. PATENT DOCUMENTS 9,931,784 B2 * 4/2018 Kline ...................... B29C 64/25

* cited by examiner

*Primary Examiner* — Jacob T Minskey
(74) *Attorney, Agent, or Firm* — Keeley DeAngelo LLP; W Scott Keeley (57) ABSTRACT

An apparatus for detaching printed objects from 3D printer enables continuous use of a 3D printer by automatically removing a completed 3D printed object from the printer bed, leaving an empty print bed that is ready for the next print job. Some embodiments of the apparatus include a moveable 3D print bed, a specially shaped raft at the base of the printed object and a stationary ejection bar with a blade that cuts and ejects the printed object from the print bed.

6 Claims, 13 Drawing Sheets

APPARATUS FOR DETACHING COMPLETED PRINTS FROM A 3D PRINTER

TECHNICAL FIELD

The present disclosure relates to apparatuses and methods for additive manufacturing, details thereof or accessories therefor, and more specifically to ejection systems for 3D-printed objects.

BACKGROUND

Three-dimensional or "3D" printing is any of various processes in which material is joined or solidified under computer control to create a 3D object, with material being added together (such as liquid molecules or powder grains being fused together), typically layer by layer. In industrial production technology, 3D printing is referred to as additive manufacturing. 3D-printed objects are produced from a digital 3D model or a CAD file.

A print bed or print surface is the planar surface on hick printed objects are built on a 3D printer.

A "raft" is an added, planar section at the base of a printed object that serves to adhere the printed object to the print bed. It is printed before the printed object is, and then the printed object is built upon it. The raft helps keep the printed object level on the print bed. It is printed so as to attach lightly to the bottom of the printed object, and once cooled can be popped off the printed object.

SUMMARY

An apparatus for detaching printed objects from the print bed of a 3D printer, enables continuous use of a 3D printer by automatically removing a completed 3D printed object from the print bed, leaving an empty print bed that is ready for the next print job.

An embodiment of the present invention is a print-job removal system which includes a moveable 3D print bed; a stationary ejection bar with a horizontal blade; a removable, 3D-printed raft that is shaped to facilitate detachment; and a slippery print-surface sheet or membrane. The sheet/membrane aids in the automatic removal of the printed object from the print bed.

The apparatus facilitates continuous printing without user intervention. It automatically removes each print job and readies the print bed for the next job in a print queue.

The apparatus employs a movable build plate (a.k.a. print bed) that conducts the printed object toward a stationary ejection bar with a blade. The stationary ejection bar has a scraper blade that is forced beneath the printed object's raft as the print bed moves against it. The blade of the stationary ejection bar cuts beneath the raft of the print job, detaching it from the print bed. The print job may then fall into a hopper or other receptacle where it can be retrieved.

Another iteration has a slippery sheet for placing on the print bed to receive the printed object as it is built from the printer. This sheet is a thin membrane constructed of an acetate, wax-paper, or parchment-like material. The sheet reduces friction between the printed object and the print bed so as to allow the printed object just enough friction to be conducted along the print bed as the print bed moves; to be pushed off the slippery sheet by a vertical wall once it comes in contact with it; and to slide off the slippery sheet once the apparatus has moved it off the print bed. One skilled in the art understands that such a sheet may be made of any type of slippery material.

The apparatus uses standard web-based software to manage print jobs with any standard networked 3D printer.

BRIEF DESCRIPTION OF THE DRAWINGS

To assist those of skill in the art of making and using the disclosed apparatus, reference is made to the accompanying figures, wherein.

DETAILED DESCRIPTION

Figure 1:
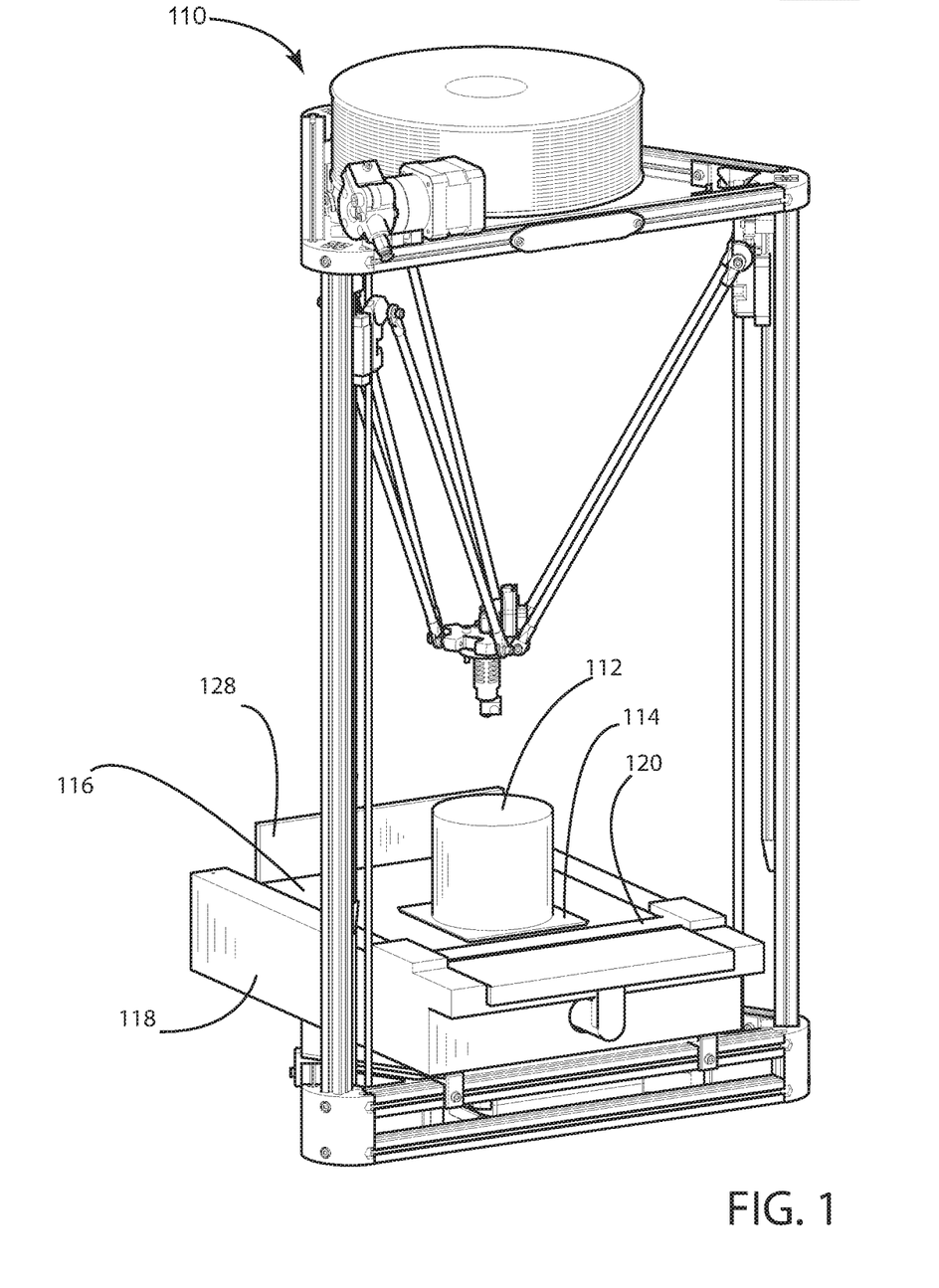
FIG. 1 is a perspective view of an iteration of the embodiment, shown in situ.
Figure 2:
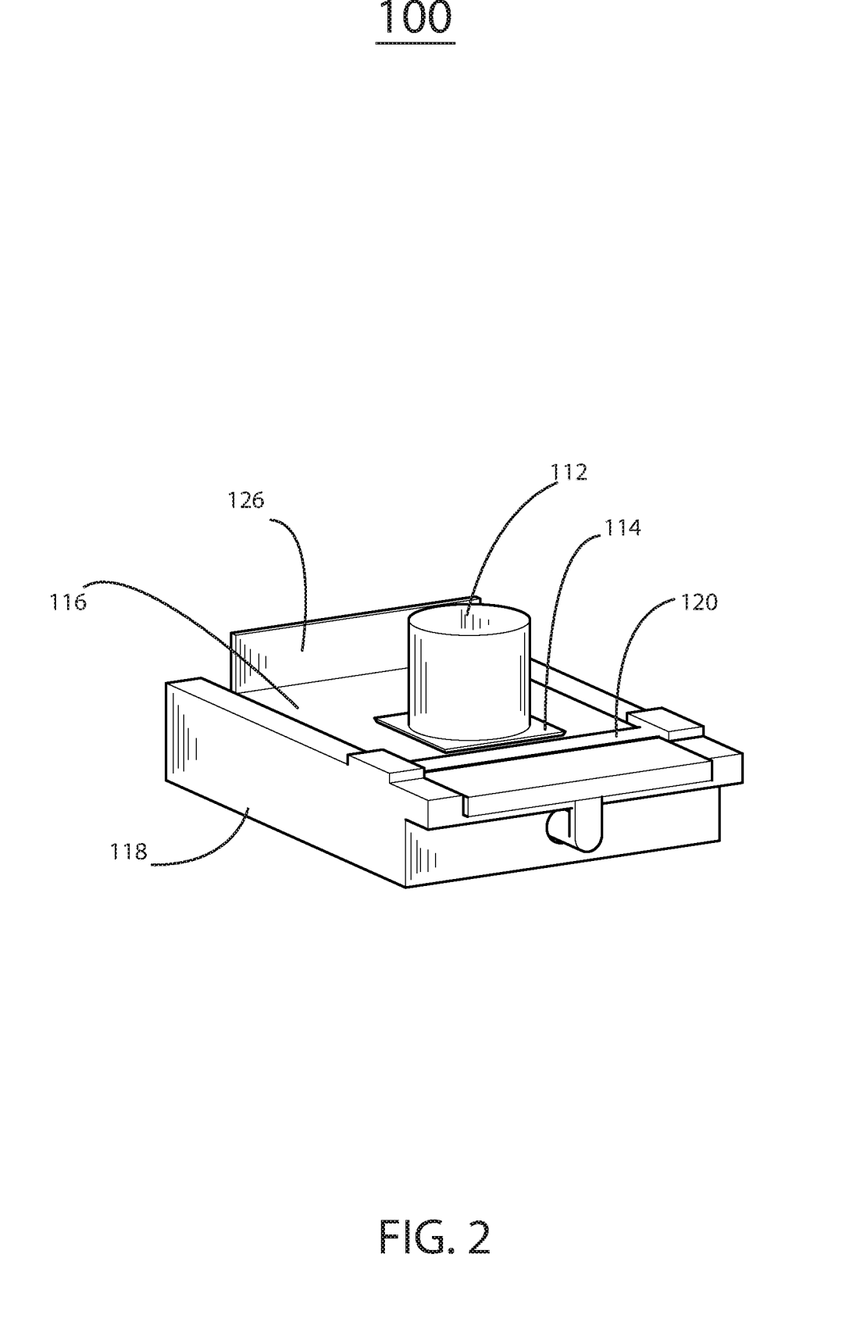
FIG. 2 is a perspective view of that iteration of the embodiment.

FIGS. 1 and 2 show an example embodiment of the apparatus 100 with FIG. 1 depicting the apparatus in situ on a provided 3D printer. The cylinder-shaped object FIGS. 1 and 2, 112 is an example of a recently 3D-printed object. At its base is a 3D-printed raft 114 that will be removed later. The printed object sits on the apparatus's movable print bed 116 which moves independently of the apparatus's base structure 118. When the print job is finished, the printed object is conducted along with the moveable print bed 116 toward the stationary ejection bar 120. When it encounters the bar 120 the object 112 is detached and then pushed or "ejected" off the print bed 116 by the bar 120.

Figure 3:
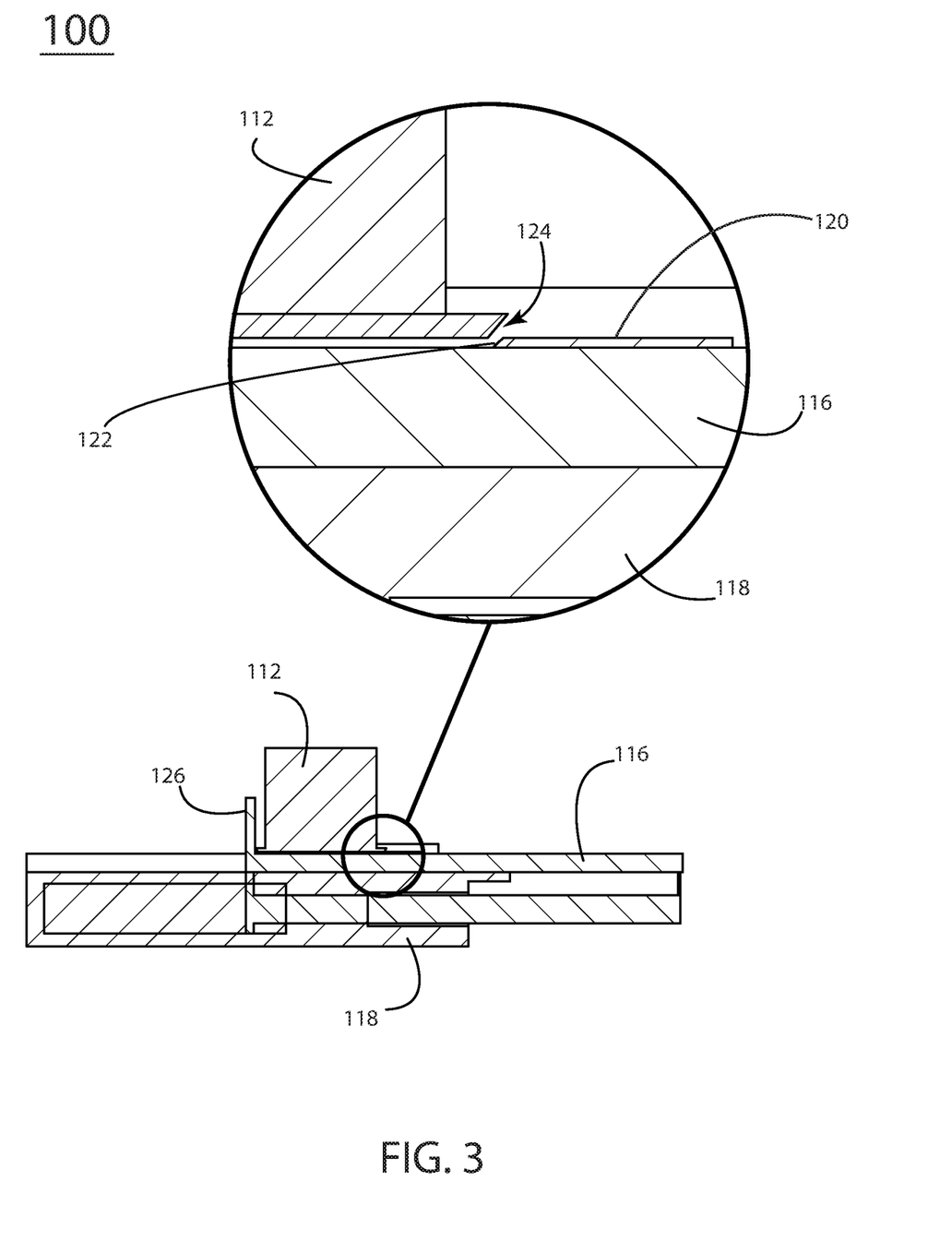
FIG. 3 is a plan view and an exploded plan view of that iteration.

In the plan view and exploded plan view of FIG. 3, a cutting blade 122 of the stationary ejection bar 120 obstructs the path of the printed object 112 that is being conducted toward it by the movable print bed 116 which is attached to a base structure or housing 118. The raft has a specially beveled edge 124 shaped to meet the cutting edge 122 so as to allow a gradual slicing-off of the printed object at its base, where the raft is. In this way the printed object 112 is gradually detached from the print bed 116. A vertical back wall 126 is a barrier that helps push printed parts off the print bed.

Figure 4:
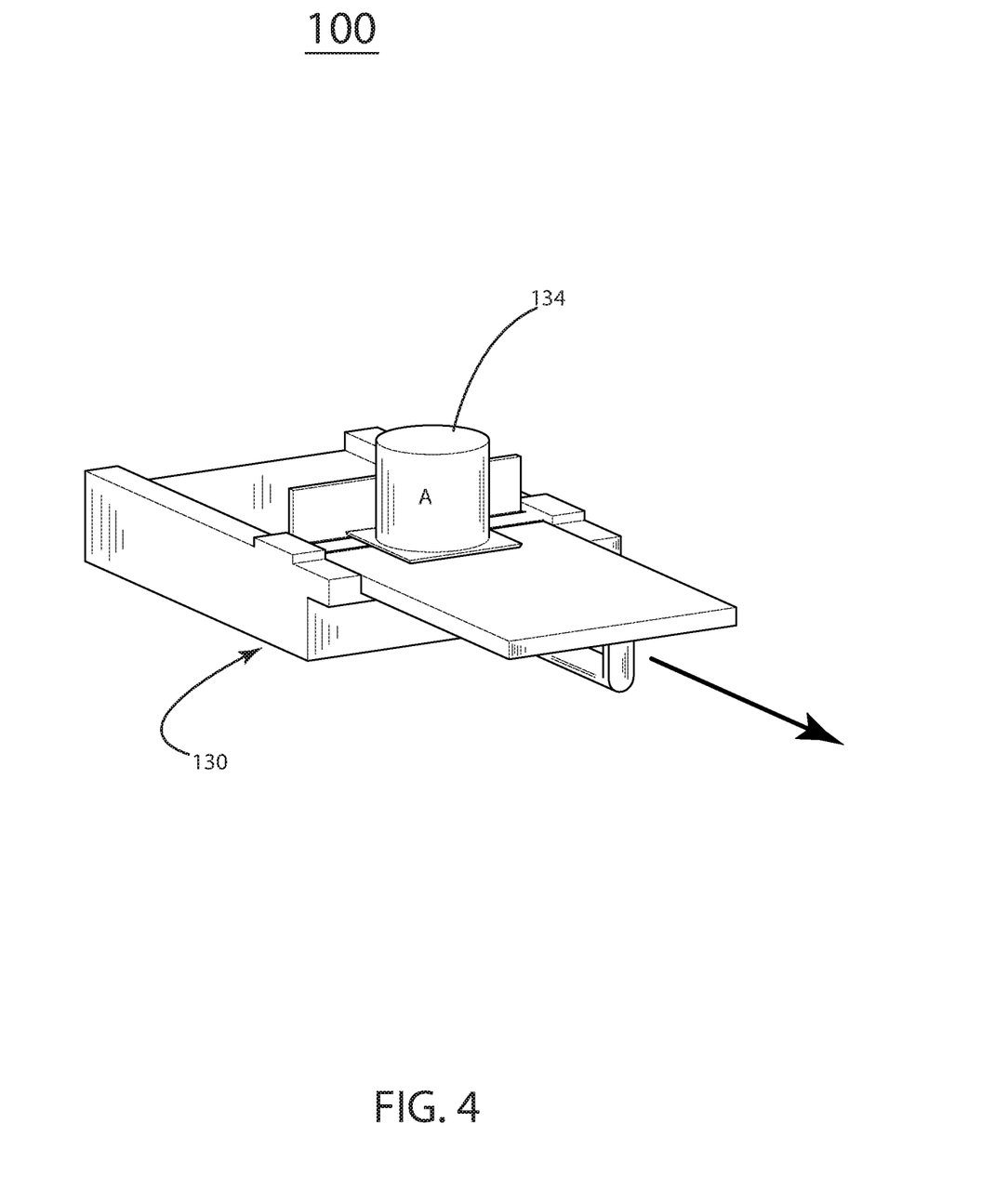
FIG. 4 is a perspective view of that iteration, shown after the print bed has moved.

In FIG. 4 the movable print bed 116 has conducted the printed object A 134 away from the print area, in the direction of the arrow. One skilled in the art understands that the print bed is controlled by a type of motorized actuator 130.

Figure 5:
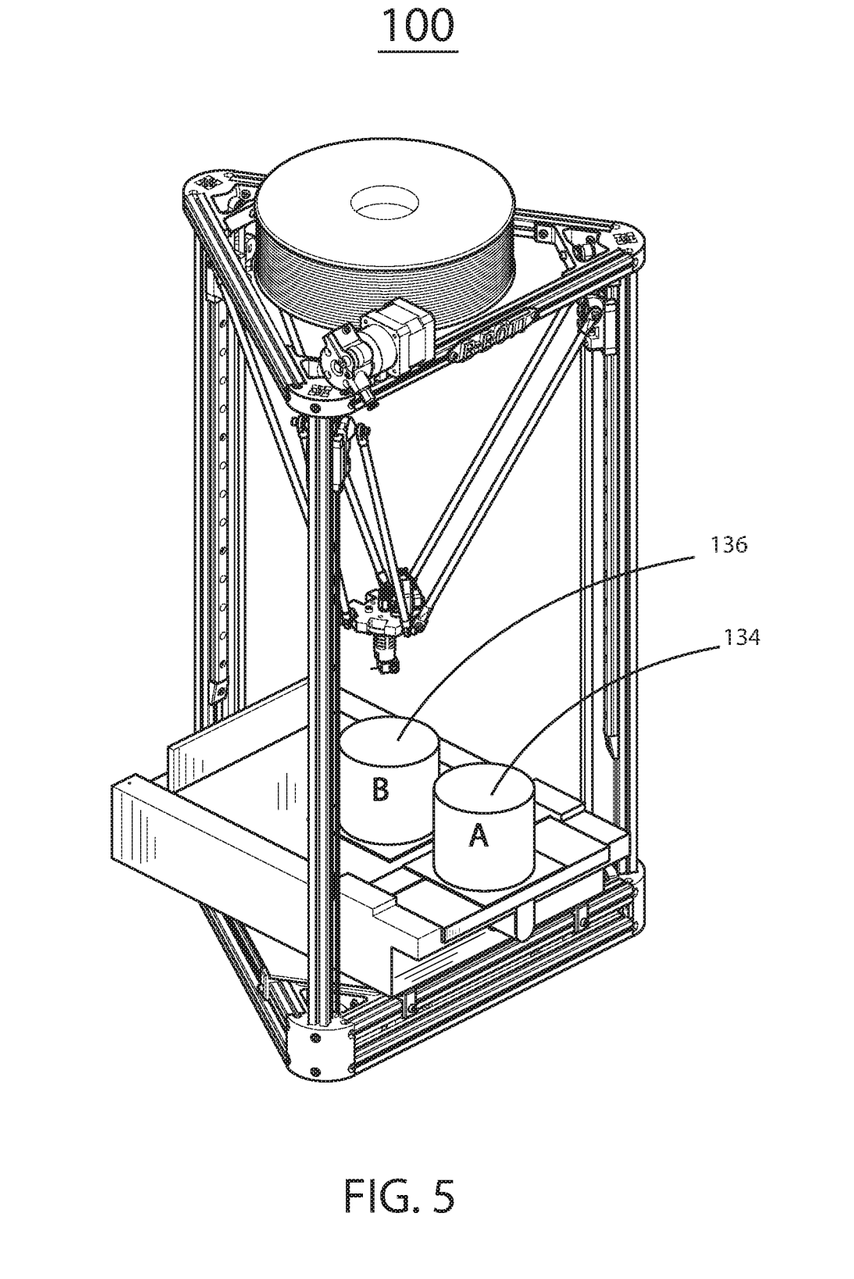
FIG. 5 is a perspective view of the iteration, showing two finished, printed objects.

FIG. 5 shows the apparatus 100 in situ. The print bed has moved back into position. The first finished, printed object A 134 remains in its moved position. A second printed object B 136 has just completed printing.

Figure 6:
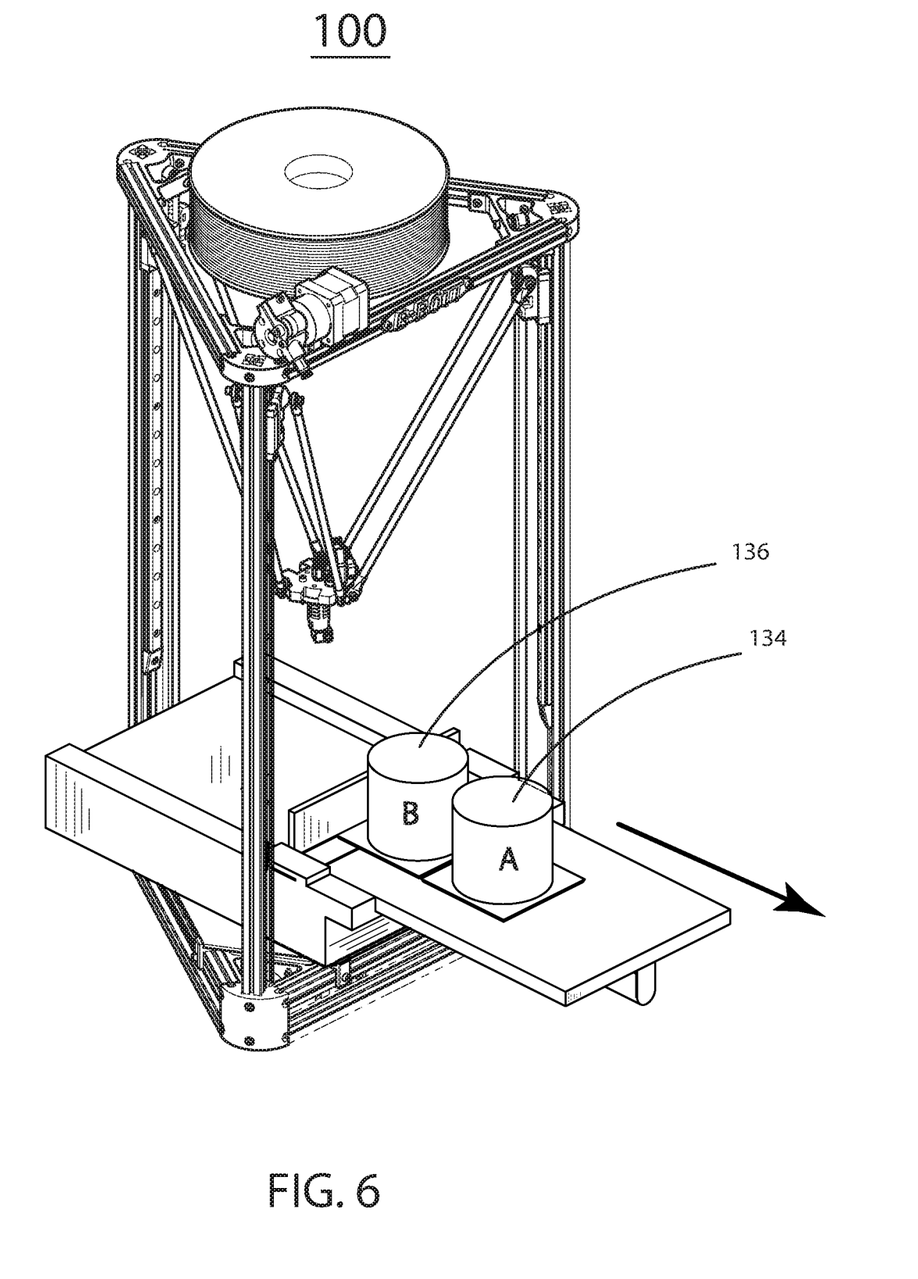
FIG. 6 is a perspective view of the iteration showing two finished, printed objects as they are moved away from the print area.

FIG. 6 is a perspective view of the apparatus 100 in situ showing two finished, printed objects (A 134 and B 136) as they are moved away from the print area in the direction of the arrow.

Figure 7:
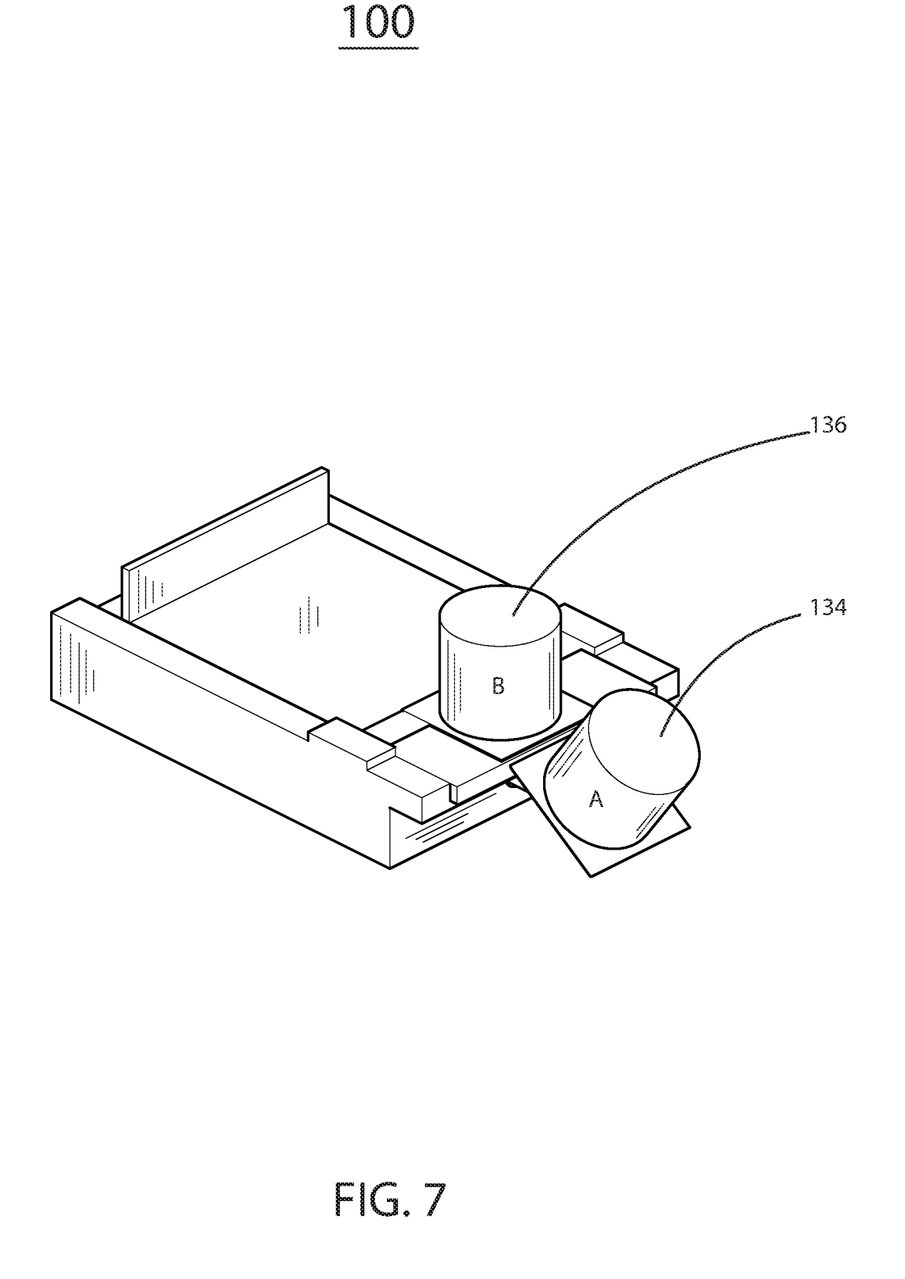
FIG. 7 is a perspective view of the iteration showing two finished, printed objects being ejected from the print area.

FIG. 7 is a perspective view of the iteration showing two finished, printed objects (A 134 and B 136) being dropped from the print area.

Figure 8:
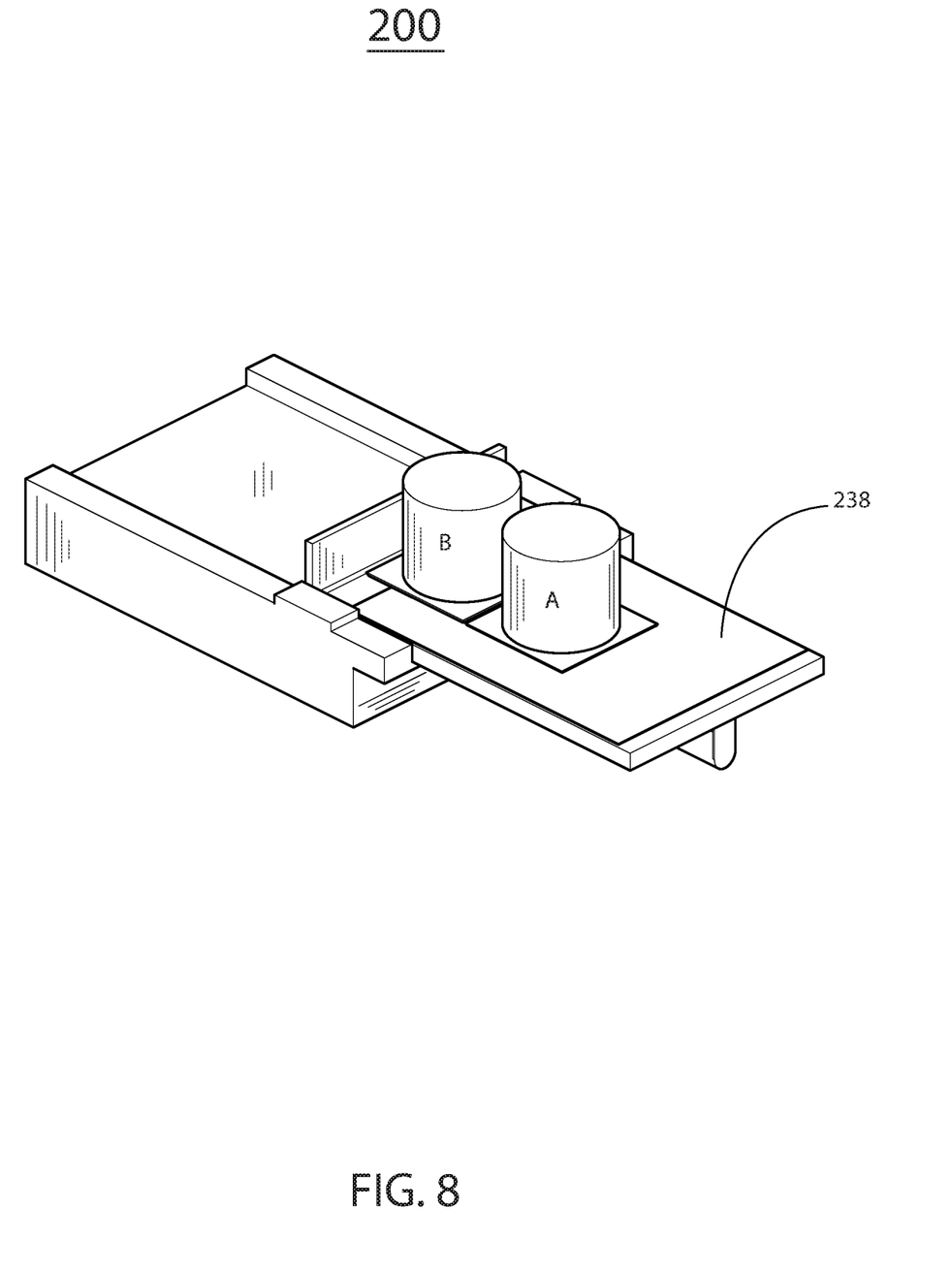
FIG. 8 is a perspective view of a 2nd iteration, showing two finished, printed objects as they are moved away from the print area.

FIG. 8 is a perspective view of a second iteration 200, showing a flexible, removable sheet 238 beneath the printed objects 234 and 236.

Figure 9:
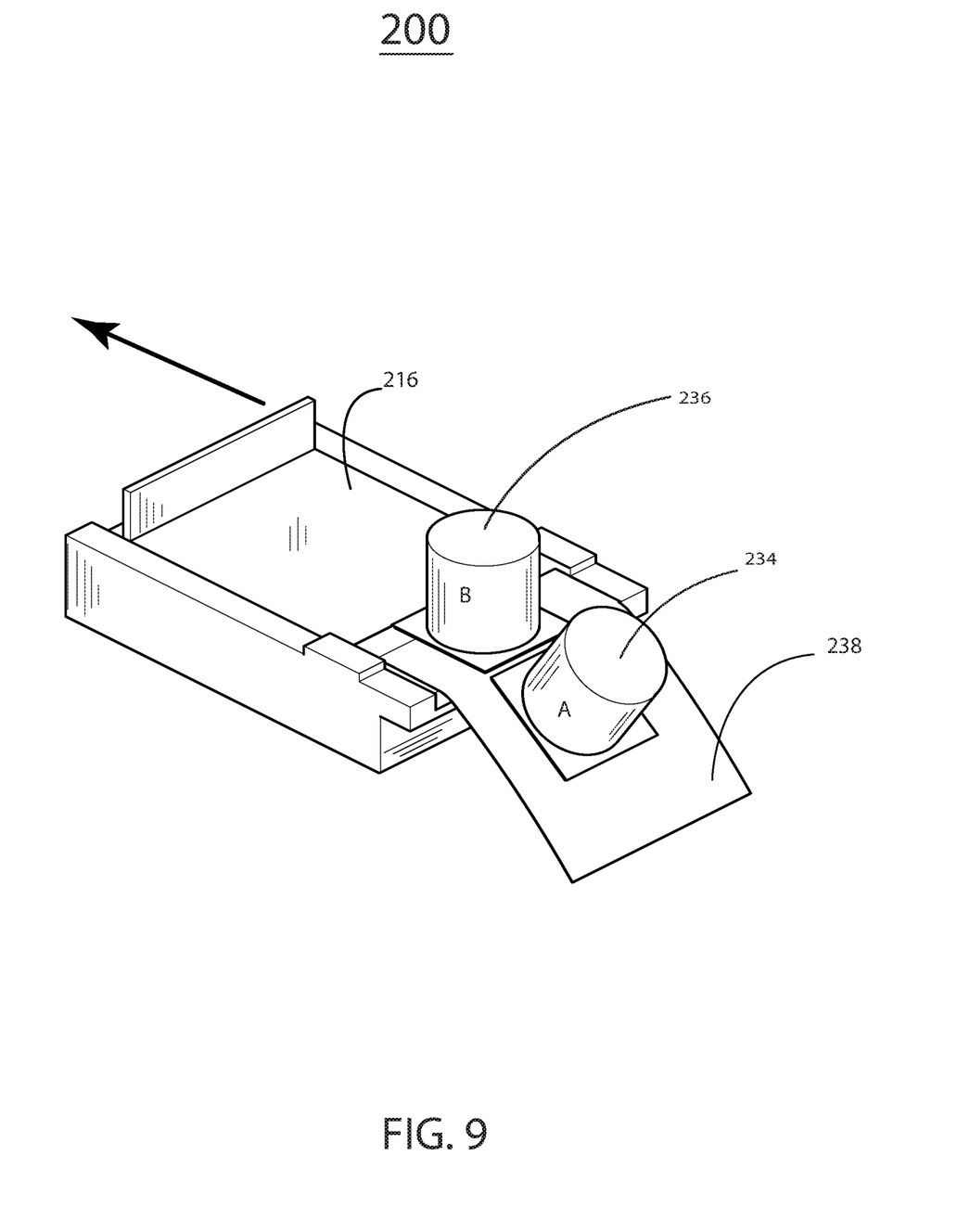
FIG. 9 is a perspective view of a second iteration, showing two finished, printed objects, one of which is being pushed off the print area as the print bed returns.

FIG. 9 is a perspective view of the second iteration showing two finished, printed objects (A 234 and B 236) dropping off the flexible sheet 238 as the print bed 216 moves back into place (in the direction of the arrow).

The flexible sheet 238 has a lower coefficient of friction than that of the print bed 216 such that a printed object can slide off the flexible sheet 238. The flexible sheet also does not stick to the print bed, allowing the print bed to slide beneath it as the print bed moves.

As the print bed returns, in the direction of the arrow, to its ready position under the printer head, it slides out from under printed object A 234. Without support of the print bed, the flexible sheet 238 then flops, dropping the printed object A 234. Printed object B 236 remains in place, out of the way of the next print job.

Figure 10:
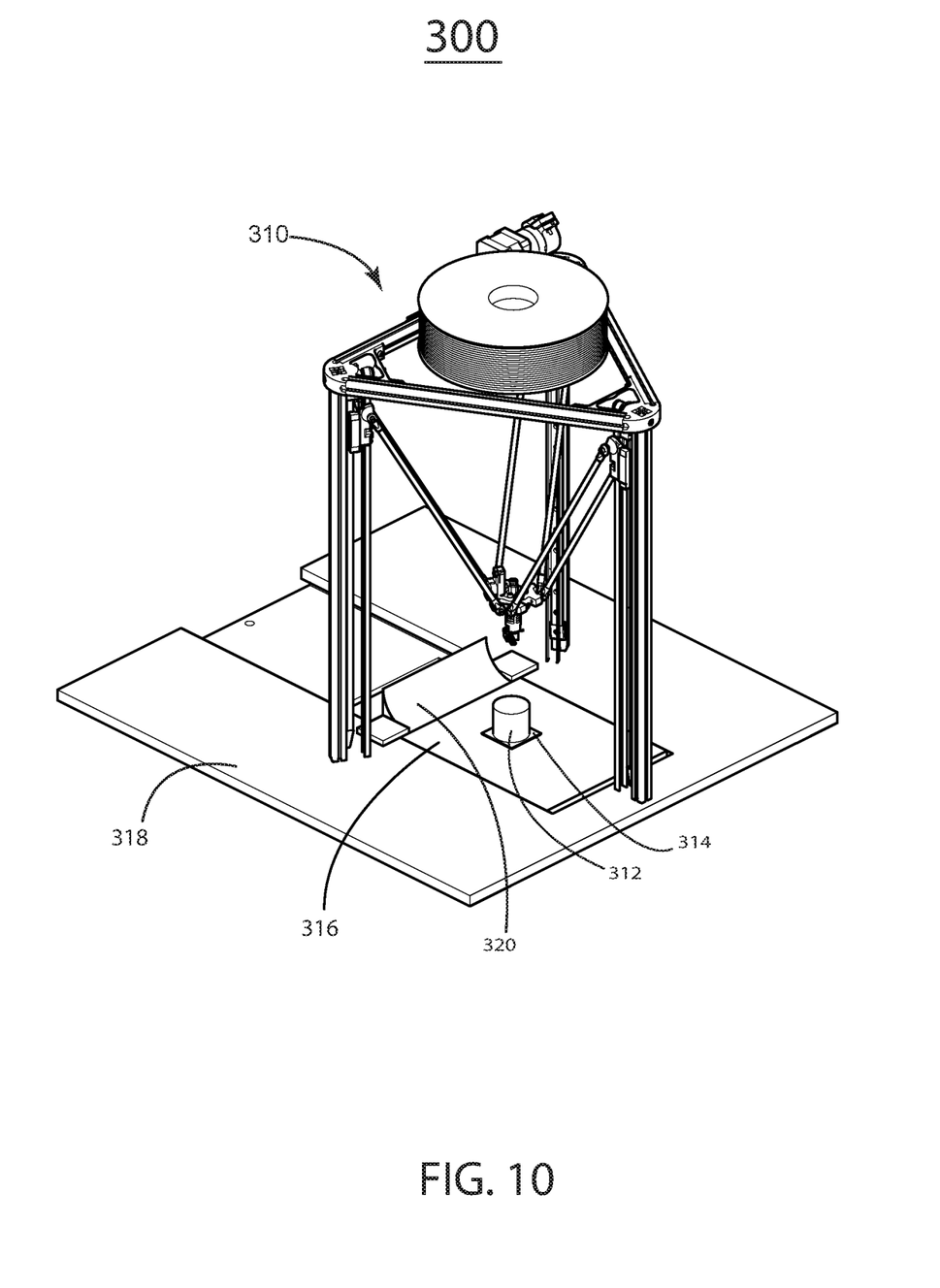
FIG. 10 is a perspective view of a third iteration of the embodiment, showing a printed object on a movable print bed.

FIG. 10 shows an iteration of the embodiment 300 in situ on a provided printer 310. An example 3D-printed object 312 is illustrated as a cylinder and is printed on a raft support structure 314. The printed object 312 sits on a movable print bed 316 which is movable upon the base structure 318. When the print job is finished, the printed object 312 is conducted along with the moveable print bed 316 toward the stationary ejection bar 320. When it encounters the bar 320 the object 312 is detached and then pushed or "ejected" off the print bed 316 by the bar's blade 122 (FIG. 3). The bar FIG. 10, 320 has an inclined, curved surface that assists in tilting the object downward.

Figure 11:
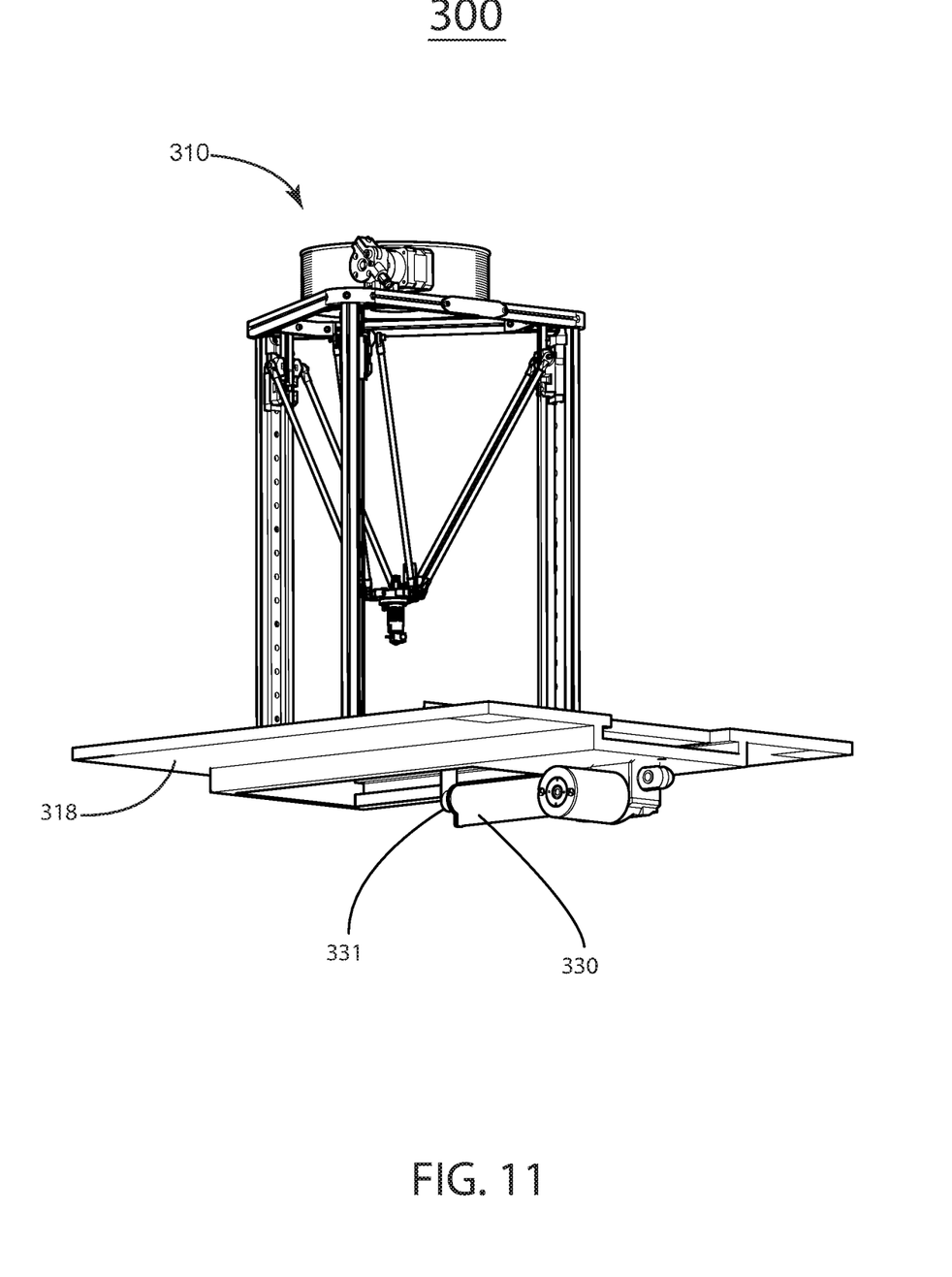
FIG. 11 is a bottom perspective view of the iteration of FIG. 10.

FIG. 11 illustrates the location of the motorized actuator 330. The motorized actuator comprises a fixed portion and a movable portion. The fixed portion is engaged with the base structure 318. The movable portion 331 is affixed to the movable bed 316 (FIG. 12).

Figure 12:
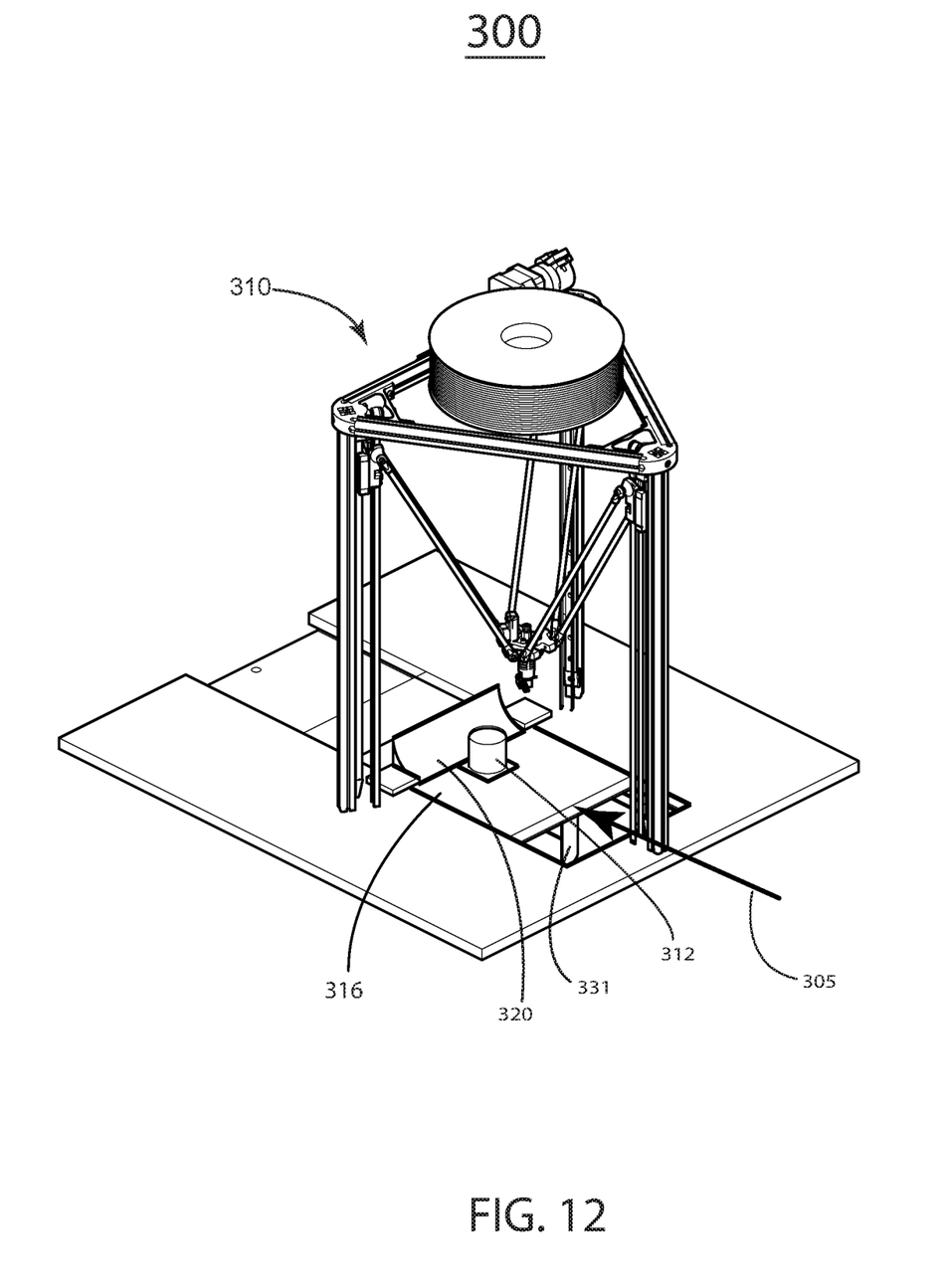
FIG. 12 is a perspective view of the iteration of FIG. 10 showing the printed object in contact with a beveled blade.

FIG. 12 illustrates the movement of the print bed 316 toward the ejection bar 320, bringing the 3D printed object 312 in contact with the ejection bar 320. The movable portion of the motorized actuator 331 is affixed to the movable bed 316, and moves the bed and the 3D printed object in the direction of the arrow 305.

Figure 13:
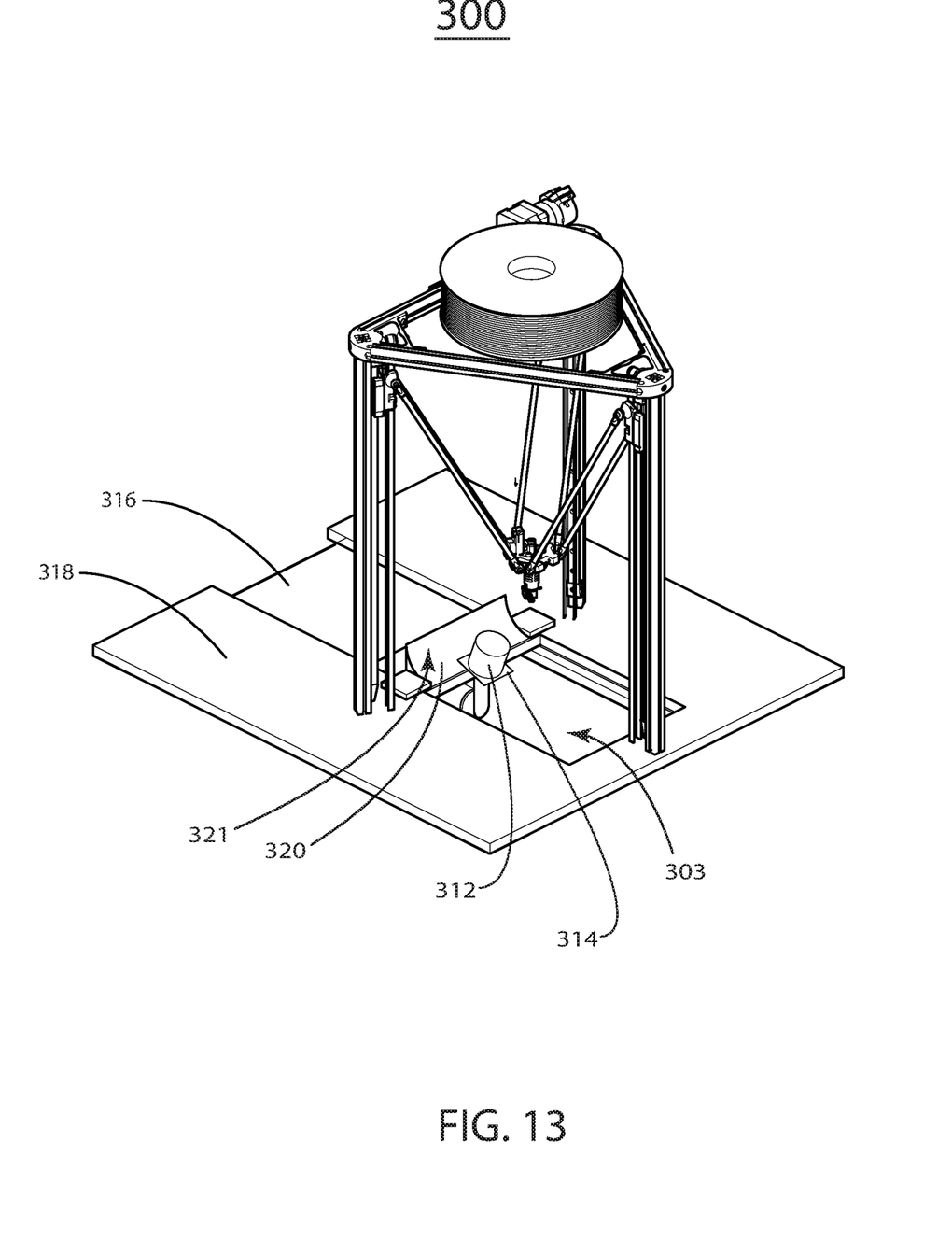
FIG. 13 is a perspective view of the iteration of FIG. 1 showing the printed object being tilted the beveled blade to drop through a hole in a table.

FIG. 13 illustrates the ejection of the 3D printed part 312 from the print bed 316. As the print bed 316 moved under the ejector bar 320, the cutting edge of the ejector bar separated the raft support structure 314 from the print bed 316. As the 3D printed object was moved by the print bed 316, it encountered the ejector bar 320, and was pushed along the ejector bar's arcuate beveled surface 321. This causes the 3D printed part 312 to slide up and off the bar's surface and then fall through a hole 303 in the base structure 318.

The invention claimed is:

1. An apparatus for detaching a printed object from a three-dimensional printer comprising:
    providing a 3D printer; and
    a base structure fixedly engaged with said provided 3D printer; and
    a print bed; and
    said print bed having a horizontal surface on which 3D objects are printed; and
    a vertical wall engaged with at least one edge of the print bed; and
    said provided 3D printer builds 3D objects on said print bed; and
    said print bed movably engaged with said base structure between at least a first position and a second position; and
    a motorized actuator fixedly engaged with said print bed, and fixedly engaged with said base structure; and
    a horizontal blade fixedly engaged with said base structure and having a cutting edge proximal to the print bed; wherein
    actuation of said motorized actuator moves the print bed from said first position to said second position; said vertical surface moving into contact with said 3D printed object, moving said 3D printed object across said horizontal blade, said horizontal blade moving between said 3D printed object and said print bed, so detaching said 3D printed object from said print bed; the motorized actuator again moving print bed to said first position, while sliding out from under said 3D printed object, which falls away from the apparatus.

2. The apparatus of claim 1 further comprising a raft support structure between said print bed and said 3D printed object, shaped to guide said horizontal blade under said raft support structure, comprising:
    a raft-support structure having at least one beveled edge; and
    said beveled edge tapering to a point that is proximal to the print bed; wherein
    said cutting edge of said blade is guided by the beveled edge to remain proximal to the print bed to sufficiently detach the 3D printed object, as said print bed moves to said second position, readying the print bed for a new print job as the print bed moves to said first position.

3. An apparatus for detaching a printed object from a 3D printer comprising:
    providing a 3D printer; and
    a base structure fixedly engaged with said provided 3D printer; and
    a print bed; and
    said print bed having a horizontal print bed on which 3D objects are printed; and
    at least one vertical surface engaged with the print bed; and
    said provided 3D printer builds 3D objects on said print bed; and
    said print bed movably engaged with said base structure between at least a first position and a second position; and
    a motorized actuator fixedly engaged with said print bed, and fixedly engaged with said base structure; and
    a horizontal blade fixedly engaged with said base structure and having a cutting edge proximal to the print bed; and
    a flexible membrane engaged with said horizontal blade and extending over said print bed and bending downward away from said base structure; wherein actuation of said motorized actuator moves the print bed from said first position to said second position, said vertical surface moving into contact with said three-dimensional printed object, and so moving said 3D printed object against said horizontal blade, said horizontal blade moving between said 3D printed object and said print bed, detaching said 3D printed object from said print bed; the motorized actuator again moved to said first position for printing again, while sliding out from under said 3D printed object which, having been pushed by said vertical surface onto said flexible membrane falls off said flexible membrane as said membrane flexes downward as said print bed returns to said first position.

4. The apparatus of claim 3 further comprising a raft-support structure atop said print bed and beneath said 3D printed object, shaped to guide said horizontal blade under said support structure comprising:
   a raft-support structure having at least one beveled edge; and
   said beveled edge tapering to a relatively smaller cross section proximal to the print bed, said cross section relatively larger proximal to said 3D printed object; wherein
   said cutting edge of said blade is guided by the beveled edge so as to remain proximal to the print bed to sufficiently detach the 3D printed object, which then rests on the flexible membrane, so that a new part may be printed on the print bed when the print bed has moved to said first position.

5. An apparatus for detaching a printed object from a three-dimensional printer comprising:
   providing a 3D printer; and
   a base structure fixedly engaged with said provided 3D printer; and
   a print bed; and
   said print bed having a horizontal surface on which 3D objects are printed; and
   said provided 3D printer builds 3D objects on said print bed; and
   said print bed movably engaged with said base structure between at least a first position and a second position; and
   a motorized actuator fixedly engaged with said print bed, and fixedly engaged with said base structure; and
   a horizontal blade fixedly engaged with said base structure comprising:
   a cutting edge proximal to the print bed; and
   an arcuate surface rising from said cutting edge, away from said print bed; wherein
   actuation of said motorized actuator moves the print bed from said first position to said second position; moving said 3D printed object across said horizontal blade, said horizontal blade moving between said 3D printed object and said print bed, so detaching said 3D printed object from said print bed, said 3D printed object moving upward along said arcuate surface and so tilting downward; the motorized actuator again moving print bed to said first position, while sliding out from under said 3D printed object, which falls away from the apparatus.

6. The apparatus of claim 5 further comprising a hole in the base structure; wherein 3D printed objects fall from the blade through the hole.

* * * * *